United States Patent
Murray et al.

(10) Patent No.: US 8,532,571 B2
(45) Date of Patent: Sep. 10, 2013

(54) METHOD AND SYSTEM FOR DETERMINING A LOCATION FOR A RF COMMUNICATION DEVICE BASED ON ITS PROXIMITY TO A MOBILE DEVICE

(75) Inventors: Dave Murray, Mission Viejo, CA (US); Charles Abraham, Los Gatos, CA (US); Mark Buer, Gilbert, AZ (US); David Garrett, Tustin, CA (US); Jeyhan Karaoguz, Irvine, CA (US); David Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 251 days.

(21) Appl. No.: 12/732,940

(22) Filed: Mar. 26, 2010

(65) Prior Publication Data

US 2011/0237185 A1    Sep. 29, 2011

(51) Int. Cl.
*H04B 5/00* (2006.01)
(52) U.S. Cl.
USPC ............. 455/41.1; 455/41.2; 455/67.11
(58) Field of Classification Search
USPC .......... 455/41.1, 41.2, 67.11, 456.1; 370/338
See application file for complete search history.

(56) References Cited

U.S. PATENT DOCUMENTS

| | | | |
|---|---|---|---|
| 6,684,055 B1 | 1/2004 | Blackaby et al. | |
| 8,116,291 B2 * | 2/2012 | Annamalai et al. | 370/338 |
| 2003/0225893 A1 * | 12/2003 | Roese et al. | 709/227 |
| 2005/0246092 A1 * | 11/2005 | Moscatiello | 701/207 |
| 2007/0106518 A1 * | 5/2007 | Wildman et al. | 705/1 |
| 2008/0048914 A1 | 2/2008 | Smith et al. | |
| 2009/0043504 A1 | 2/2009 | Bandyopadhyay et al. | |
| 2009/0098880 A1 * | 4/2009 | Lindquist | 455/456.1 |
| 2010/0260064 A1 * | 10/2010 | Garg et al. | 370/254 |
| 2011/0200023 A1 | 8/2011 | Murray et al. | |

FOREIGN PATENT DOCUMENTS

WO  WO 2006/119412 A2  11/2006
WO  WO 2007/018790 A1   2/2007

OTHER PUBLICATIONS

"Coaxial cable," Wikipedia, accessed at World Wide Web en.wikipedia.org/wiki/Coaxial_cable, accessed on Jun. 21, 2012, 16 pages, see pp. 1-2.
European Search Report for EP Application No. EP 11 00 1233, Munich, Germany, search completed on Dec. 28, 2011.
"Radio-frequency identification," Wikipedia, accessed at World Wide Web en.wikipedia.org/wiki/Radio-frequency_identification, accessed on Jun. 21, 2012, 23 pages, see pp. 1,3.

* cited by examiner

*Primary Examiner* — Tuan H Nguyen
(74) *Attorney, Agent, or Firm* — Sterne, Kessler, Goldstein & Fox P.L.L.C.

(57) ABSTRACT

A mobile device may be operable to determine, based on a known location of the mobile device, a location for a RF communication device that communicates with the mobile device, whenever the mobile device is within proximate range of the RF communication device. The determined location for the RF communication device may be stored in a location database in a location server and/or a memory in the RF communication device. The stored location of the RF communication device may then be used to determine a location for other mobile devices that may communicate with the RF communication device and are within proximate range of the RF communication device. The RF communication device may comprise a radio-frequency identification (RFID) device and/or a near field communication (NFC) device. The determined location for the RF communication device may comprise the known location of the mobile device.

22 Claims, 4 Drawing Sheets

METHOD AND SYSTEM FOR DETERMINING A LOCATION FOR A RF COMMUNICATION DEVICE BASED ON ITS PROXIMITY TO A MOBILE DEVICE

CROSS-REFERENCE TO RELATED APPLICATIONS/INCORPORATION BY REFERENCE

This patent application makes reference to, claims priority to, and claims benefit from U.S. Provisional Application Ser. No. 61/304,198, which was filed on Feb. 12, 2010.

This application makes reference to:
U.S. Provisional Application Ser. No. 61/304,210 filed on Feb. 12, 2010; U.S. patent application Ser. No. 12/748,194 filed on Mar. 26, 2010; U.S. Provisional Application Ser. No. 61/305,174 filed on Feb. 17, 2010; and U.S. patent application Ser. No. 12/732,986 filed on Mar. 26, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for determining a location for a RF communication device based on its proximity to a mobile device.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, time of arrival (TOA), observed time difference of arrival (OTDOA), enhanced observed time difference (E-OTD) as well as the global navigation satellite system (GNSS) such as GPS, GLONASS, Galileo, Compass, and/or assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for determining a location for a RF communication device based on its proximity to a mobile device, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for determining a location for a RF communication device based on its proximity to a mobile device. In various embodiments of the invention, whenever a mobile device is within proximate range of a RF communication device, the mobile device may be operable to determine, based on a known location of the mobile device, a location for the RF communication device when the RF communication device communicates with the mobile device. The determined location of the RF communication device may be stored in a remote storage device such as, for example, a location database in a location server and/or a memory in the RF communication device. The stored location of the RF communication device may then be used for location-based services (LBS). The RF communication device may be a short-range wireless communication device that may be used for identification, tracking and/or exchange of data. The mobile device may comprise, for example, a radio-frequency identification (RFID) enabled mobile device which may be equipped with, or comprise a RFID tag and/or a RFID reader. In this regard, the RF communication device may comprise a RFID device that communicates with the RFID enabled mobile device whenever the RFID enabled mobile device is within proximate range of the RFID device. The determined location for the RFID device may comprise the known location of the RFID enabled mobile device. The mobile device may comprise, for example, a near field communication (NFC) enabled mobile device. In this regard, the RF communication device may comprise a NFC device that communicates with the NFC enabled mobile device whenever the NFC enabled mobile device is within proximate range of the NFC device. The determined location for the NFC device may comprise the known location of the NFC enabled mobile device.

The stored location information of the RF communication device may then be used to determine a location of one or more other mobile devices that may communicate with the RF communication device, whenever the one or more other mobile devices may be within proximate range of the RF communication device.

Figure 1:
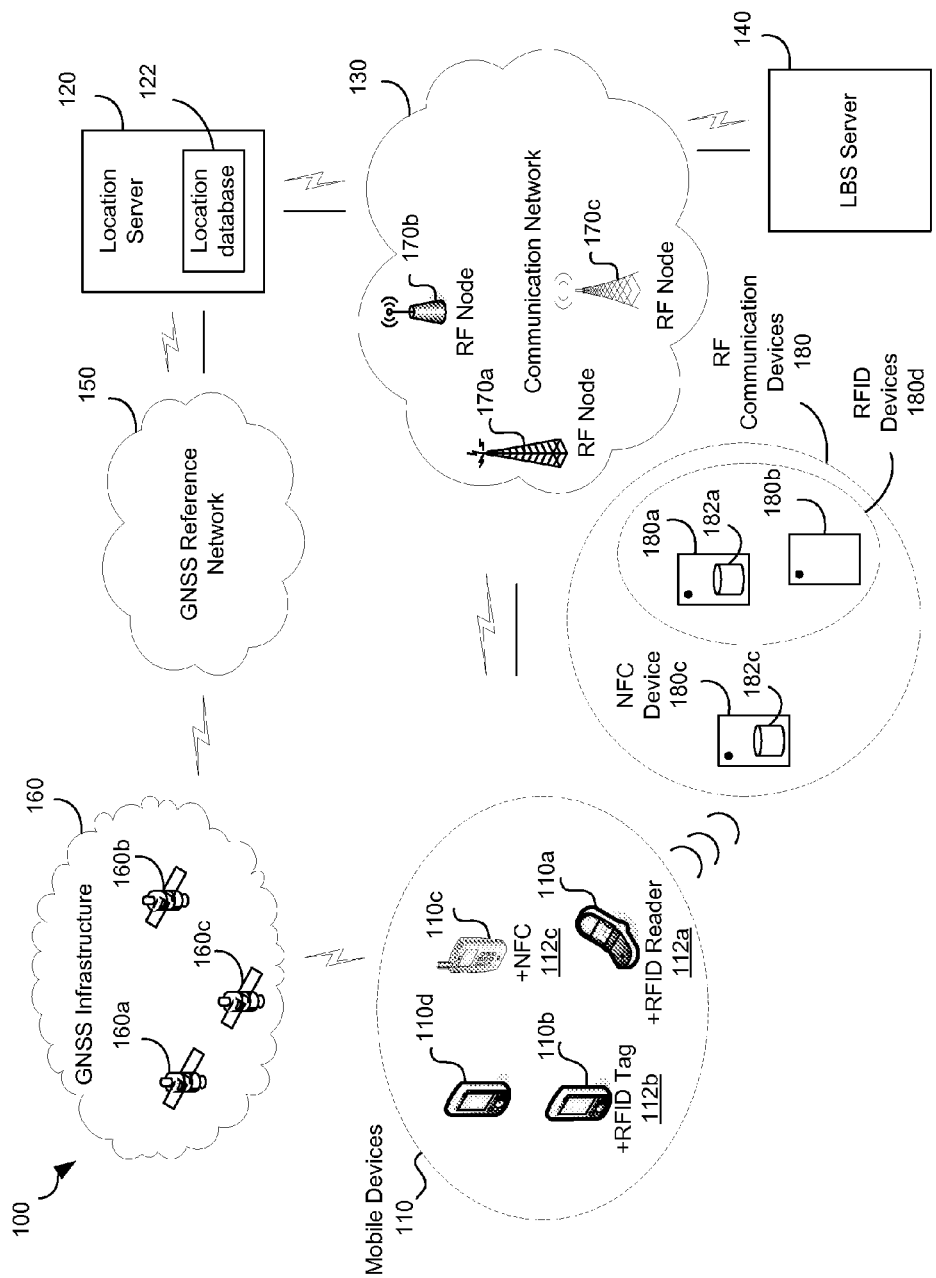
FIG. 1 is a block diagram illustrating an exemplary communication system that is operable to determine a location for a RF communication device based on its proximity to a mobile device, in accordance with an embodiment of the invention.

FIG. 1 is a block diagram illustrating an exemplary communication system that is operable to determine a location for a RF communication device based on its proximity to a mobile device, in accordance with an embodiment of the invention. Referring to FIG. 1, there is shown a communication system 100. The communication system 100 comprises a plurality of mobile devices 110, of which mobile devices 110a-110d are illustrated, a location server 120 comprising a location database 122, a communication network 130, a LBS server 140, a GNSS reference network 150, a GNSS infrastructure 160 and a plurality of RF communication devices 180. The communication network 130 may comprise a plurality of RF nodes, of which RF nodes 170a-170c are illustrated. The GNSS infrastructure 160 may comprise a plurality of GNSS satellites, of which GNSS satellites 160a-160c are illustrated.

Each of the RF communication devices 180 may comprise suitable logic, circuitry, interfaces and/or code that may be operable to communicate with, for example, the mobile device 110, whenever the mobile device 110 is within proximate range, using radio-frequency (RF) signals for the purposes of, for example, identification, tracking and/or exchange of data.

In accordance with an embodiment of the invention, the RF communication device 180 may be, for example, a RFID device 180d. The RFID device 180d may be enabled to operate as either a RFID tag 180a or a RFID reader 180b. The RFID tag 180a may be affixed to or incorporated into a product, animal or person for the purpose of identification and/or tracking. The RFID tag 180a may be an active RFID tag, which comprises a battery and may transmit signals autonomously. The RFID tag 180a may be a passive RFID tag, which may not comprise a battery and may require an external source such as, for example, the RFID reader 112a to cause a resulting signal transmission. The RFID tag 180a may also be a battery assisted passive (BAP) RFID tag, which requires an external source such as the RFID reader 112b to wake it up. In this regard, the RFID tag 180a may have a significantly higher forward link capability providing great read range. In an exemplary embodiment of the invention, a RFID reader 180b installed in a train station may communicate with a RFID tag 112b installed in, integrated within, or affixed to a mobile device such as the mobile device 110b. In this regard, whenever the RFID tag 112b is within proximate range such as, for example, within 10 centimeters of the RFID reader 180b, a ticket collection or payment transaction may be initiated. The RFID device 180d may be a passive RFID tag 180a, which may be installed in a smart poster, for example. The RFID tag 180a may be operable to communicate, for example, movie information to a RFID reader 112a, whenever the RFID reader 112a is within proximate range of the passive RFID tag 180a. The RFID reader 112a may be installed in a mobile device such as the mobile device 110a. The RFID tag 180a may comprise a memory 182a such as, for example, a non-volatile memory.

In another embodiment of the invention, the RF communication device 180 may be, for example, a NFC device 180c. The use of NFC enables the exchange of data between devices over a short distance such as, for example, a 10-centimemter distance. The NFC device 180c may comprise a NFC tag and a NFC reader in a single device. The NFC device 180c may also be able to communicate with a RFID tag 112b and/or a RFID reader 112a, whenever the RFID tag 112b and/or a RFID reader 112a are within proximate range of the NFC device 180c. The NFC device 180c, which functions as a NFC reader and is installed in a train station may communicate with a NFC device 112c, which is a NFC tag and is installed in a mobile device such as the mobile device 110c. The communication may occur whenever the NFC device 112c (tag) is within proximate range such as, for example, within 10 centimeters of the NFC device 180c (reader), and may be utilized to collect a ticket payment. A passive NFC device 180c, which functions as a tag and is installed in a smart poster may communicate, for example, movie information to a NFC device 112c, which functions as a reader and is installed in the mobile device 110c. The communication may occur whenever the NFC device 112c (reader) is within proximate range of the passive NFC device 180c (tag). The NFC device 180c may comprise a memory 182c such as, for example, a non-volatile memory.

A location of the RF communication device 180 may be determined by the mobile device 110, whenever the RF communication device 180 is within proximate range of, and/or communicates with the mobile device 110. In this regard, the determined location for the RF communication device 180 may comprise the known location of the communicated mobile device 110. The determined location for the RF communication device 180 may be uploaded by the mobile device 110 to the location server 120 and stored in the location database 122 in the location server 120. In instances when the RF communication device 180 may comprise a memory, such as, for example, the memory 182a in the RFID tag 180a or the memory 182c in the NFC device 180c, the determined location for the RF communication device 180 may be uploaded by the mobile device 110 to the RF communication device 180a or 180c and stored in the memory 182a or 182c respectively. In an exemplary embodiment of the invention, a location of the RF communication device 180a or 180c may be programmed and stored in the memory 182a or 182c respectively while the RF communication device 180a or 180c is installed by a vendor. The stored location of the RF communication device 180 may then be used to determine a location for the other mobile device such as, for example, the mobile device 110d that may communicate with the RF communication device 180, whenever the mobile device 110d is within proximate range of the RF communication device 180.

Each of the mobile devices 110 may comprise suitable logic, circuitry, interfaces and/or code that may be operable to communicate radio signals across the communication network 130, for example, via the RF nodes 170a-170c. The mobile device 110, for example, may be operable to receive GNSS broadcast signals from a plurality of visible GNSS satellites such as GNSS satellites 160a-160c in the GNSS infrastructure 160. The mobile device 110 may collect and report device-assisted location information of data, for example, for a RF node such as the RF node 170a to the location server 120 for updating the location database 122.

The mobile device 110 may be operable to determine, based on a known location of the mobile device 110, a location for a RF communication device 180 that communicates with the mobile device 110, whenever the mobile device 110 is within a proximate range of the RF communication device 180. The mobile device 110 may be, for example, a RFID enabled mobile device 110a or 110b, which may comprise a RFID reader 112a or a RFID tag 112b. In instances when the RFID enabled mobile device 110b comprises a RFID tag 112b, the RF communication device 180 may be a RFID reader 180b that communicates with the RFID tag 112b in the RFID enabled mobile device 110b, whenever the RFID tag 112b is within proximate range of the RFID reader 180b. The determined location of the RFID reader 180b may comprise the known location of the RFID enabled mobile device 110*b*. In instances when the RFID enabled mobile device 110*a* comprises a RFID reader 112*a*, the RF communication device 180 may be a RFID tag 180*a* that communicates with the RFID reader 112*a* in the RFID enabled mobile device 110*a*, whenever the RFID reader 112*a* is within proximate range of the RFID tag 180*a*. The determined location of the RFID tag 180*a* may comprise the known location of the RFID enabled mobile device 110*a*. The mobile device 110 may be, for example, a NFC enabled mobile device 110*c* which may comprise a NFC device 112*c*. In this regard, the RF communication device 180 may be a NFC device 180*c* that communicates with the NFC device 112*c* in the NFC enabled mobile device 110*c*, whenever the NFC device 112*c* is within proximate range of the NFC device 180*c*. The determined location for the NFC device 180*c* may comprise the known location of the NFC enabled mobile device 110*c*.

The determined location for the RF communication device 180 may be stored in, for example, the location database 122 in the location server 120 and/or the memory in the RF communication device 180 such as the memory 182*a* in the RFID tag 180*a* or the memory 182*c* in the NFC device 180*c*. The stored location information of the RF communication device 180 may then be used to determine a location for the other mobile device 110*d*. The other mobile device 110*d* may communicate with the RF communication device 180 whenever the RF communication device 180 is within proximate range of the other mobile device 110*d*.

The location server 120 may comprise suitable logic, circuitry, interfaces and/or code that may be operable to access the GNSS reference network 150 to collect GNSS satellite data by tracking GNSS constellations through the GNSS reference network 150. The location server 120 may be operable to utilize the collected GNSS satellite data to generate GNSS assistance data (A-GNSS data) comprising, for example, ephemeris data, LTO data, reference positions and/or time information. The location server 120 may be operable to collect and/or retrieve location information or data from associated users such as the RF nodes 170*a*-170*c* and/or the mobile devices 110*a*-110*d*. For example, the location server 120 may be operable to receive location information of the RF node 170*a* and/or location information of the RF communication device 180 from the mobile device 110*a*. The received location information or data may be stored in the location database 122 so that it may be shared among associated mobile devices 110*a*-110*d* such as the mobile device 110*d*. The location server 120 may be operable to communicate the stored location information as A-GNSS data, for example, to the mobile device 110*d*, when need.

The communication network 130 may comprise suitable logic, circuitry, interfaces and/or code that may be operable to provide voice and data services to various mobile devices such as the mobile devices 110*a*-110*c* by using wireless and/or wired communication technologies such as, for example, WCDMA, UMTS, HSDPA, CDMA, EV-DO, GSM, GPRS, EDGE, EGPRS, LTE, Bluetooth, WiMAX, WiFi, FM, mobile TV and Ethernet. The communication network 130 may be operable to provide communication among the location server 120, the LBS server 140 and a plurality of served mobile devices such as the mobile devices 110*a*-110*d*. The communication network 130 may comprise a plurality of RF nodes such as, for example, the RF nodes 170*a*-170*c*. The RF node 170*a* is a RF network device that may comprise, for example, a cell station, a wireless access point (AP) and/or a FM station.

The LBS server 140 may comprise suitable logic, circuitry, interfaces and/or code that may be operable to provide location based services (LBS). The LBS server may be operable to retrieve information such as, for example, local hotel addresses or a map of the vicinity of areas of interest. The LBS server 140 may be operable to communicate the retrieved information with various communication devices such as the mobile device 110 based on an associated position or location.

The GNSS reference network 150 may comprise suitable logic, circuitry, interfaces and/or code that may be operable to collect and/or distribute data for GNSS satellites 160*a*-160*c* on a continuous basis. The GNSS reference network 150 may comprise a plurality of GNSS reference tracking stations or receivers located around the world to provide A-GNSS coverage all the time in both a home network and/or any visited network. The GNSS reference network 150 may be communicatively coupled to the location server 120. The collected GNSS data or information may be utilized by the location server 120 to enhance LBS performance.

Each of the GNSS satellites 160*a*-160*c* such as the satellite 160*a* may comprise suitable logic, circuitry, interfaces and/or code that may be operable to generate and broadcast satellite navigational information. The broadcast satellite navigation information may be collected by the mobile devices 110*a*-110*d*, for example. The broadcast satellite navigational information may be collected by the GNSS reference network 150 to be utilized by the location server 120 to enhance LBS performance. The GNSS satellites 160*a*-160*c* may comprise, for example, GPS, GLONASS, Galileo and/or Compass satellites.

In operation, the mobile device 110 may be operable to determine, based on a known location of the mobile device 110, a location for a RF communication device 180 that communicates with the mobile device 110, whenever the mobile device 110 is within a proximate range of the RF communication device 180. The mobile device 110 may be, for example, a RFID enabled mobile device 110*a* or 110*b*, which may comprise a RFID reader 112*a* or a RFID tag 112*b*. In instances when the RFID enabled mobile device 110*b* comprises a RFID tag 112*b*, the RF communication device 180 may comprise a RFID reader 180*b* that communicates with the RFID tag 112*b* in the RFID enabled mobile device 110*b*, whenever the RFID tag 112*b* is within proximate range of the RFID reader 180*b*. The determined location for the RFID reader 180*b* may comprise the known location of the RFID enabled mobile device 110*b*. In instances when the RFID enabled mobile device 110*a* comprises a RFID reader 112*a*, the RF communication device 180 may comprise a RFID tag 180*a* that communicates with the RFID reader 112*a* in the RFID enabled mobile device 110*a*, whenever the RFID reader 112*a* is within proximate range of the RFID tag 180*a*. The determined location for the RFID tag 180*a* may comprise the known location of the RFID enabled mobile device 110*a*. The mobile device 110 may be, for example, a NFC enabled mobile device 110*c* which may comprise a NFC device 112*c*. In this regard, the RF communication device 180 may be a NFC device 180*c* that communicates with the NFC device 112*c* in the NFC enabled mobile device 110*c*, whenever the NFC device 112*c* is within proximate range of the NFC device 180. The determined location for the NFC device 180*c* may comprise the known location of the NFC enabled mobile device 110*c*.

The determined location for the RF communication device 180 may be stored in, for example, the location database 122 in the location server 120 and/or the memory in the RF communication device 180 such as the memory 182*a* in the RFID tag 180*a* or the memory 182*c* in the NFC device 180*c*. The stored location information of the RF communication device 180 may then be used to determine a location for the other mobile device 110d. The other mobile device 110d may communicate with the RF communication device 180 whenever the RF communication device 180 is within proximate range of the other mobile device 110d.

Figure 2:
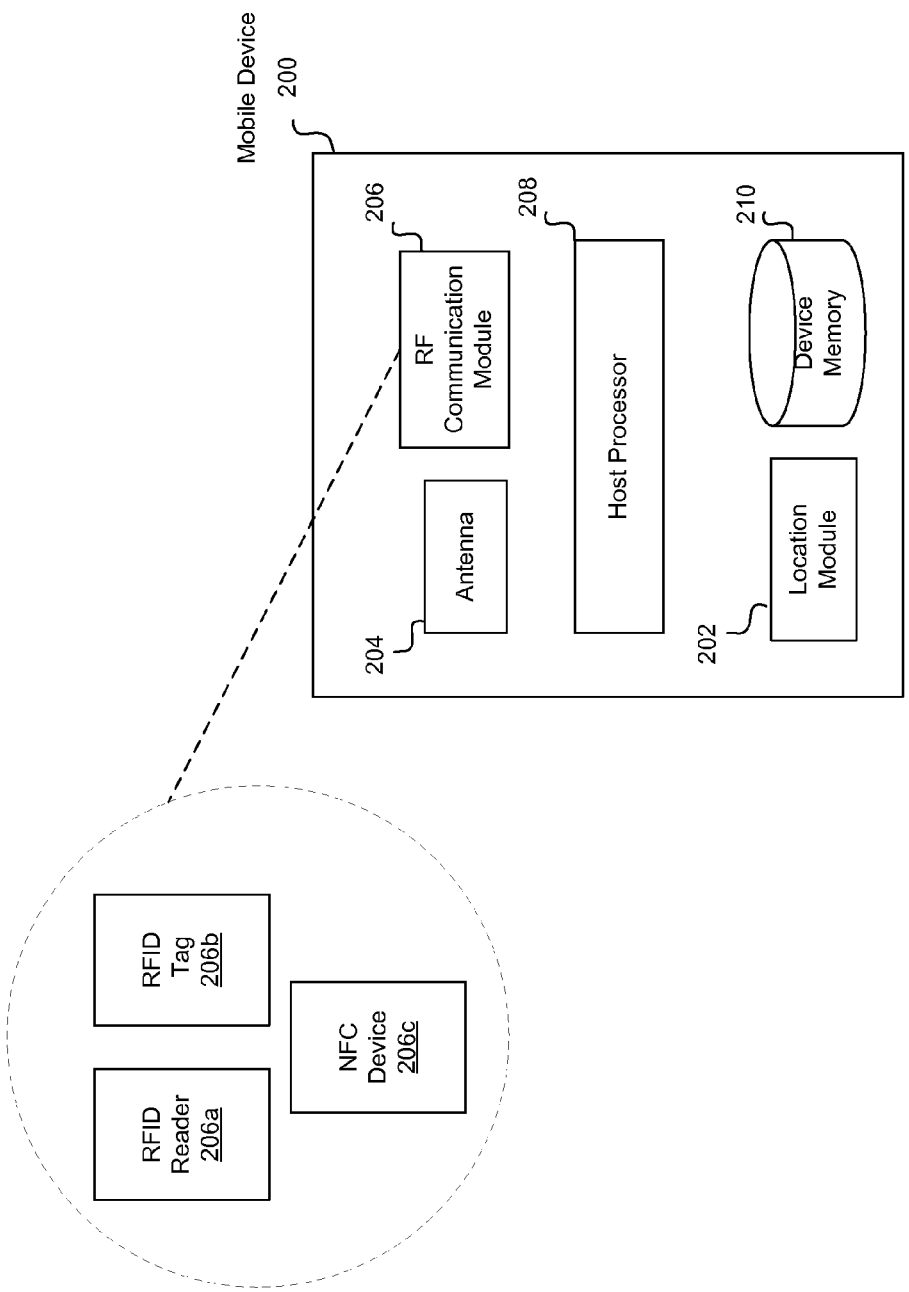
FIG. 2 is a block diagram illustrating an exemplary mobile device that is operable to determine a location for a RF communication device based on its proximity to a mobile device, in accordance with an embodiment of the invention.

FIG. 2 is a block diagram illustrating an exemplary mobile device that is operable to determine a location for a RF communication device based on its proximity to a mobile device, in accordance with an embodiment of the invention. Referring to FIG. 2, there is shown a mobile device 200. The mobile device 200 may comprise a location module 202, an antenna 204, a RF communication module 206, a host processor 208 and a device memory 210.

The RF communication module 206 may comprise suitable logic, circuitry, interfaces and/or code that may be operable to communicate with, for example, the RF communication device 180, whenever the RF communication device 206 is within a proximate range using RF signals for the purposes of, for example, identification, tracking and/or exchange of data. The RF communication module 206 may comprise, for example, a RFID reader 206a, a RFID tag 206b and/or a NFC device 206c. In instances when the RF communication module 206 comprises the RFID tag 206b and/or the RFID reader 206a, the mobile device 200 may be a RFID enabled mobile device 110b or 110a. In instances when the RF communication module 206 comprises the NFC device 206c, the mobile device 200 may be a NFC enabled mobile device 110c. In an exemplary embodiment of the invention, the RF communication module 206 may be operable to collect identification information of the RF communication device 180, while communicating with the RF communication device 180 such as, for example, a RFID tag 180a, a RFID reader 180b and/or a NFC device 180c, for the purpose of determining a location for the RF communication device 180. The collected identification information of the RF communication device 180 may be communicated by the RF communication module 206 to the location module 202 in the mobile device 200.

The location module 202 may comprise suitable logic, circuitry, interfaces and/or code that may be operable to collect device-assisted location data and provide or report the collected location data to the location server 120 for updating the location database 122. In an exemplary embodiment of the invention, the location module 202 may be operable to receive the identification information for the RF communication device 180. The identification information may be received whenever the RF communication module 206 is within proximate range of the RF communication device 180 and communicates with the RF communication device 180. The location module 202 may be operable to determine the location for the identified RF communication device 180 based on a known location of the mobile device 200. In this regard, the determined location for the identified RF communication device 180 may comprise the known location of the mobile device 200. The location module 202 may be operable to upload the determined location for the identified RF communication device 180 to, for example, the location server 120 and store the determined location for the identified RF communication device 180 in the location database 122 in the location server 120. In instances when the identified RF communication device 180 comprises a memory 182a or 182c, the location module 202 may also be operable to upload the determined location for the identified RF communication device 180 to the identified RF communication device 180 and store the determined location for the identified RF communication device 180 in the memory such as the memory 182a or 182c. The stored location of the identified RF communication device 180 may then be used to determine a location for other mobile devices that communicates with the identified RF communication device 180, whenever these other mobile devices are within proximate range of the identified RF communication device 180.

The antenna 204 may comprise suitable logic, circuitry, interfaces and/or code that may be operable to communicate radio signals over the communication network 130 using various wireless access technologies.

The host processor 208 may comprise suitable logic, circuitry, interfaces and/or code that may be operable to process signals from the antenna 204 and/or the location module 202. The host processor 208 may manage and/or control operations of the antenna 204 and/or the location module 202. The host processor 208 may be operable to communicate signals with the communication network 130 via the antenna 204. The host processor 208 may also be operable to receive A-GNSS data from the location server 120 over the antenna 204.

The device memory 210 may comprise suitable logic, circuitry, interfaces and/or code that may be operable to store information such as executable instructions, data and/or database that may be utilized by the host processor 208 and the location module 202. The device memory 210 may comprise RAM, ROM, low latency nonvolatile memory such as flash memory and/or other suitable electronic data storage.

In operation, the RF communication module 206 may be operable to communicate with the RF communication device 180 within a proximate range using RF signals. The RF communication module 206 may comprise, for example, a RFID reader 206a, a RFID tag 206b and/or a NFC device 206c. In instances when the RF communication module 206 comprises the RFID tag 206b and/or the RFID reader 206a, the mobile device 200 may be a RFID enabled mobile device 110b or 110c. In instances when the RF communication module 206 comprises the NFC device 206c, the mobile device 200 may be a NFC enabled mobile device 110c. The RF communication module 206 may be operable to collect identification information of the RF communication device 180 while communicating with the RF communication device 180 such as, for example, a RFID tag 180a, a RFID reader 180b and/or a NFC device 180c for the purpose of determining a location for the RF communication device 180. The collected identification information of the RF communication device 180 may be communicated by the RF communication module 206 to the location module 202 in the mobile device 200.

The location module 202 may be operable to receive the identification information for the RF communication device 180. The identification information may be received whenever the RF communication module 206 is within proximate range of the RF communication device 180 and communicates with the RF communication device 180. The location module 202 may be operable to determine the location for the identified RF communication device 180 based on a known location of the mobile device 200. In this regard, the determined location for the identified RF communication device 180 may comprise the known location of the mobile device 200. The location module 202 may be operable to upload the determined location for the identified RF communication device 180 to, for example, the location server 120 and store the determined location for the identified RF communication device 180 in the location database 122 in the location server 120. In instances when the identified RF communication device 180 comprises a memory 182a or 182c, the location module 202 may also be operable to upload the determined location of the identified RF communication device 180 to the identified RF communication device 180 and store the determined location for the identified RF communication device 180 in the memory such as the memory 182a or 182c. The stored location of the identified RF communication device 180 may then be used to determine a location for one or more other mobile devices that communicates with the identified RF communication device 180, whenever the one or more other mobile devices are within proximate range of the identified RF communication device 180.

Figure 3:
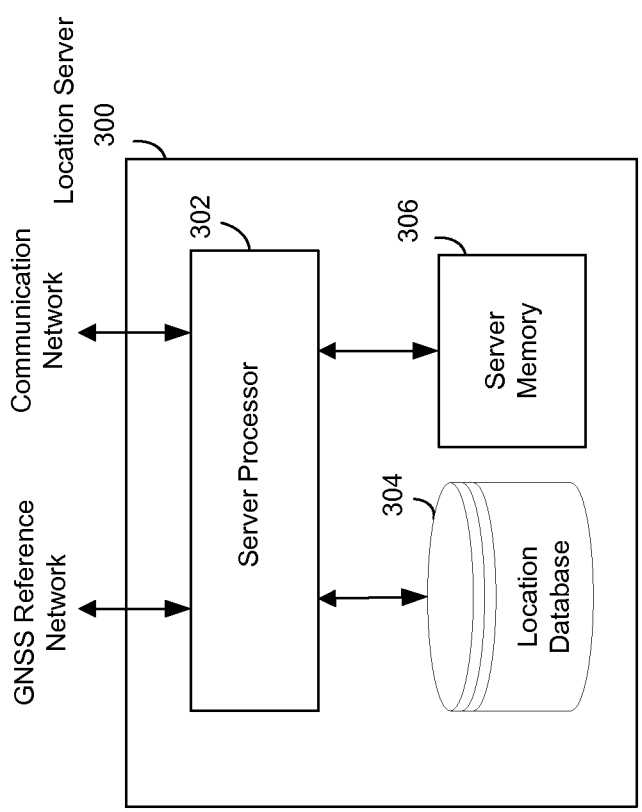
FIG. 3 is a block diagram illustrating an exemplary location server that is operable to determine a location for a RF communication device based on its proximity to a mobile device, in accordance with an embodiment of the invention.

FIG. 3 is a block diagram illustrating an exemplary location server that is operable to determine a location for a RF communication device based on its proximity to a mobile device, in accordance with an embodiment of the invention. Referring to FIG. 3, there is shown a location server 300. The location server 300 may comprise a server processor 302, a location database 304 and a server memory 306.

The server processor 302 may comprise suitable logic, circuitry, interfaces and/or code that may be operable to manage and/or control operations of the location database 304 and/or the server memory 306. The server processor 302 may be operable to communicate with the GNSS reference network 150 so as to collect GNSS satellite data by tracking GNSS constellations through the GNSS reference network 150. The server processor 302 may utilize the collected GNSS satellite data to build the location database 304, which may be coupled internally or externally to the location server 300. The server processor 302 may be operable to receive location information or data from associated users such as the mobile device 110a. The received location information or data may be stored in the location database 304 to share among associated users. In an exemplary embodiment of the invention, the server processor 302 may be operable to receive location information or data for the RF communication device 180 from a mobile device such as the mobile device 110a.

The location database 304 may comprise suitable logic, circuitry, interfaces and/or code that may be operable to store location information of associated reference devices such as, for example, the RF nodes 170a-170c and/or the RF communication device 180. The stored location information may be provided to associated communication devices such as the mobile devices 110a-110d to support LBS applications such as location-based access control. In an exemplary embodiment of the invention, the location database 304 may be updated utilizing the location information or data for the RF communication device 180 received by the server processor 302 from a mobile device such as the mobile device 110a.

The server memory 306 may comprise suitable logic, circuitry, interfaces and/or code that may be operable to store information such as executable instructions and data that may be utilized by the server processor 302 and/or other associated component units such as, for example, the location database 304. The server memory 306 may comprise RAM, ROM, low latency nonvolatile memory such as flash memory and/or other suitable electronic data storage.

In operation, the server processor 302 may be operable to receive the location information or data for the RF communication device 180 from a mobile device such as the mobile device 110a. The location database 304 may be updated utilizing the location information or data for the RF communication device 180 received by the server processor 302.

Figure 4:
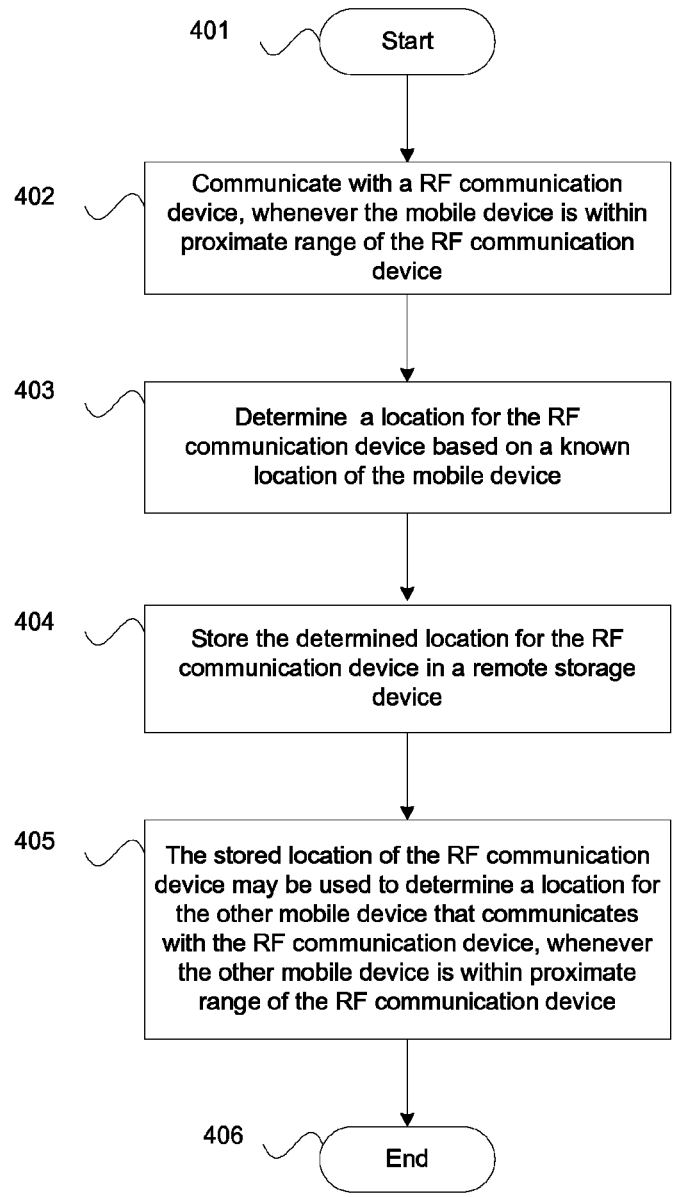
FIG. 4 is a flow chart illustrating exemplary steps for determining a location for a RF communication device based on its proximity to a mobile device, in accordance with an embodiment of the invention.

FIG. 4 is a flow chart illustrating exemplary steps for determining a location for a RF communication device based on its proximity to a mobile device, in accordance with an embodiment of the invention. Referring to FIG. 4, the exemplary steps start at step 401. In step 402, the RF communication module 206 in the mobile device 200 may be operable to communicate with a RF communication device 180, whenever the RF communication module 206 in the mobile device 200 is within proximate range of the RF communication device 180. In step 403, the location module 202 in the mobile device 200 may be operable to determine a location for the RF communication device 180 based on a known location of the mobile device 200. In step 404, the location module 202 may be operable to store the determined location for the RF communication device 180 in a remote storage device such as, for example, in a location database 122 in a location server 120 and/or in a memory 182a or 182c in the RF communication device 180a or 180c. In step 405, the stored location of the RF communication device 180 may be used to determine a location for the other mobile device 110d that communicates with the RF communication device 180, whenever the other mobile device 110d is within proximate range of the RF communication device 180. The exemplary steps may proceed to the end step 406.

In various embodiments of the invention, whenever a mobile device 110 is within proximate range of a RF communication device 180, the mobile device 110 may be operable to determine, based on a known location of the mobile device 110, a location for the RF communication device 180 when the RF communication device 180 communicates with the mobile device 110. The determined location for the RF communication device 180 may be stored in a remote storage device such as, for example, a location database 122 in a location server 120 and/or a memory 182a or 182c in the RF communication device 180a or 180c. The stored location of the RF communication device 180 may then be used for location-based services (LBS). The RF communication device 180 may be a short-range wireless communication device that may be used for identification, tracking and/or exchange of data. The mobile device 110 may comprise, for example, a RFID enabled mobile device 110a or 110b which may be equipped with a RFID reader 112a or a RFID tag 112b. In this regard, the RF communication device 180 may comprise a RFID device 180d that communicates with the RFID enabled mobile device 110a or 110b, whenever the RFID device 180d is within proximate range of the RFID device 180d. The determined location for the RFID device 180d may comprise the known location of the RFID enabled mobile device 110a or 110b. The mobile device 110 may comprise, for example, a NFC enabled mobile device 110c. In this regard, the RF communication device 180 may comprise a NFC device 180c that communicates with the NFC enabled mobile device 110c, whenever the NFC enable device 180 is within proximate range of the NFC device 180c. The determined location for the NFC device 180c may comprise the known location of the NFC enabled mobile device 110c.

The stored location information of the RF communication device 180 may then be used to determine a location for the other mobile device 110d that may communicate with the RF communication device 180, whenever the other mobile device 110d is within proximate range of the RF communication device 180.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining a location for a RF communication device based on its proximity to a mobile device.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    communicating, by a mobile device, with a RF communication device when said mobile device is within a proximate range of said RF communication device;
    retrieving, by said mobile device, a location of said RF communication device from a storage device, said retrieved location of said RF communication device being previously determined based on a known location of a previous mobile device; and
    determining, by said mobile device, a location for said mobile device based on said retrieved location.

2. The method according to claim 1, wherein said mobile device comprises a radio-frequency identification (RFID) enabled mobile device.

3. The method according to claim 2, wherein said RF communication device comprises a RFID device that communicates with said RFID enabled mobile device when said RFID enabled mobile device is within a proximate range of said RFID device.

4. The method according to claim 3, wherein said retrieved location for said RFID device comprises said known location of said previous mobile device, said previous mobile device being a previous RFID enabled mobile device.

5. The method according to claim 1, wherein said mobile device comprises a near field communication (NFC) enabled mobile device.

6. The method according to claim 5, wherein said RF communication device comprises a NFC device that communicates with said NFC enabled mobile device when said NFC enabled mobile device is within a proximate range of said NFC device.

7. The method according to claim 6, wherein said retrieved location for said NFC device comprises said known location of said previous mobile device said previous mobile device being a previous NFC enabled mobile device.

8. The method according to claim 1, wherein said retrieving comprises:
    retrieving said retrieved location from a location database in a location server.

9. The method according to claim 1, wherein said retrieving comprises:
    retrieving said retrieved location from a memory in said RF communication device.

10. The method of claim 1, wherein said retrieved location of said RF communication device is utilized for location-based services (LBS).

11. A mobile device, comprising:
    a RF communication module configured to communicate with a RF communication device when said mobile device is within a proximate range of said RF communication device;
    a location module configured to:
        retrieve a location of said RF communication device from a storage device, said retrieved location of said RF communication device being previously determined by a previous mobile device based on a known location of said previous mobile device; and
        determine a location for said mobile device based on said retrieved location; and
    a processor configured to control operation of said RF communication module and said location module.

12. The mobile device according to claim 11, wherein said RF communication module comprises a radio-frequency identification (RFID) enabled communication module.

13. The mobile device according to claim 12, wherein said RF communication device comprises a RFID device that is configured to communicate with said RFID enabled communication module when said mobile device is within a proximate range of said RFID device.

14. The mobile device according to claim 13, wherein said retrieved location for said RFID device comprises said known location of said previous mobile device, said previous mobile device being a previous RFID enabled mobile device.

15. The mobile device according to claim 11, wherein said RF communication module comprises a near field communication (NFC) enabled communication module.

16. The mobile device according to claim 15, wherein said RF communication device comprises a NFC device that is configured to communicate with said NFC enabled communication module when said mobile device is within a proximate range of said NFC device.

17. The mobile device according to claim 16, wherein said retrieved location for said NFC device comprises said known location of said previous mobile device, said previous mobile device being a previous NFC enabled mobile device.

18. The mobile device according to claim 11, wherein said storage device comprises a location database in a location server.

19. The mobile device according to claim 11, wherein said storage device comprises a memory in said RF communication device.

20. The mobile device according to claim 11, wherein said retrieved location of said RF communication device is utilized for location-based services (LBS).

21. A method, comprising:
    receiving, at a location server, a first location corresponding to a RF communication device from a first mobile device, said first location being determined by said first mobile device based on a known location of said first mobile device; and
    providing, from said location server, said first location of said RF communication device to a second mobile device for determining a second location corresponding to said second mobile device based on said first location.

22. The method of claim 21, further comprising:

collecting at said location server global navigation satellite system (GNSS) satellite data from a GNSS reference network; and generating GNSS assistance data at said location server based on said GNSS data and said first location of said RF communication device, wherein said providing of said first location to said second mobile device comprises:

providing said GNSS assistance data to said second mobile device.

* * * * *

UNITED STATES PATENT AND TRADEMARK OFFICE
CERTIFICATE OF CORRECTION

PATENT NO. : 8,532,571 B2  Page 1 of 1
APPLICATION NO. : 12/732940
DATED : September 10, 2013
INVENTOR(S) : Murray et al.

It is certified that error appears in the above-identified patent and that said Letters Patent is hereby corrected as shown below:

In the Claims

Column 11, line 66, please replace "device said" with --device, said--.

Signed and Sealed this
Twenty-sixth Day of August, 2014

Michelle K. Lee
*Deputy Director of the United States Patent and Trademark Office*